INVENTOR.
Karl-Theodor Seidl

Oct. 27, 1964  KARL-THEODOR SEIDL  3,153,815
INJECTION MOLDING APPARATUS
Filed Oct. 28, 1963  2 Sheets-Sheet 2
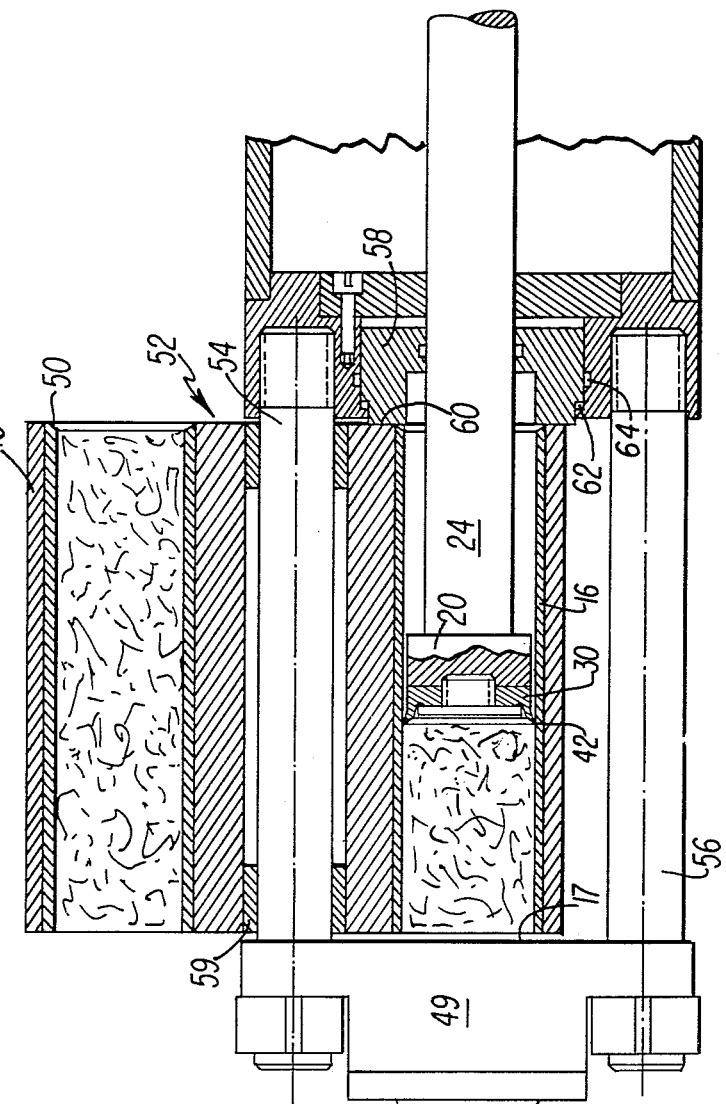
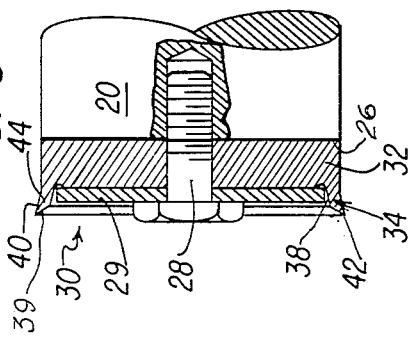
INVENTOR.
Karl-Theodor Seidl
BY
Silverman + Cass
Attys.

ically to injection molding
apparatus and more particularly concerns the provision
of novel injection means for such apparatus whereby the
same is capable of being utilized for the injection molding
of thermosetting materials, including rubbers.

United States Patent Office 3,153,815
Patented Oct. 27, 1964

3,153,815
INJECTION MOLDING APPARATUS
Karl-Theodor Seidl, Tizianstrasse 70, Munich,
Bavaria, Germany
Filed Oct. 28, 1963, Ser. No. 319,479
Claims priority, application Germany, Feb. 19, 1960,
S 67,187
13 Claims. (Cl. 18—30)

This invention relates generally to injection molding
apparatus and more particularly concerns the provision
of novel injection means for such apparatus whereby the
same is capable of being utilized for the injection molding
of thermosetting materials, including rubbers.

This application is a continuation-in-part of my co-pending application, Serial Number 87,905 filed February 8, 1961 for the invention entitled "Die-Casting Machine," now abandoned.

Injection molding machines for use with thermoplastic materials are well known and include injection means comprising an injection cylinder having a close fitting piston reciprocably mounted therein. A nozzle is generally provided at one end of the cylinder and aligned with the inlet of a mold. The thermoplastic material is introduced within the cylinder and a piston stroke initiated to force said material through the nozzle into the mold. The pressures utilized during injection molding are substantial and in sharp contrast to that encountered in extrusion molding apparatus. Where thermoplastics are concerned, heat is desirable and often, the injection means are provided with heating elements so that the material may be fluidized for facile injection thereof into the mold from the injection cylinder. However, where thermosetting materials, such as rubber, are considered, the generation of heat may be fatal to a successful molding operation. Even the degree of heat generated during the piston stroke by normal friction between the piston and the inner circumferential wall of the cylinder is sufficient to cause the temperature of the material to rise above the setting point thereof and thus cause the piston to be seized within the cylinder after only a few piston strokes. While the problem was recognized early in the history of the molding art, no practical solution was yet forthcoming. Other processes for molding thermosetting materials into useful products were required to be utilized, such as press molding, extrusion molding and the like. The advantages of injection molding technique for forming unusual shaped products such as bellows, rings, undercut casings and the like could not be utilized if the materials chosen were of the thermosetting type. Where some products could be made by less desirable techniques, others could not, and hence, functionally advantageous thermosetting materials could not be utilized to manufacture many complex structures.

One of the principal sources of heat is that generated during a piston stroke and arising from the frictional contact of the piston head with the inner circumferential wall of the injection cylinder. It would appear that the immediate solution for reduction of the heat so generated would be available by reducing the area of contact between the piston head and the inner circumferential wall of the injection cylinder. However since the injection molding technique requires high pressures, upwards of one thousand kilograms per square centimeter, any reduction in the area of contact between the piston head and the inner circumferential wall of the cylinder must take into consideration the retention of sufficient strength whereby the piston head could not collapse or distort under the substantial pressure to which it is subjected during the injection stroke. If such collapse results, the material will flow or seep past the piston head and harden, thereby freezing the piston within the cylinder. To successfully apply injection molding technique to thermosetting materials one must not only reduce the frictional heat generated during the injection stroke, but one must also prevent passage of any material behind the piston head as the same moves toward the nozzle.

Accordingly, it is the principal object of the invention to provide injection means for injection molding apparatus wherein the conditions enumerated above and heretofore fatal to successful application of injection molding technique to thermosetting material are substantially eliminated.

Another object of the invention is to provide injection apparatus including a novel sealing means for the piston head thereof whereby the heat generated during the injection stroke of the piston is substantially reduced while sufficient strength of the piston head is retained to prevent distortion or collapse thereof.

A further object of the invention is to provide injection apparatus which includes a cylinder, a piston head mounted for reciprocable movement within the cylinder, said piston head being smaller in diameter than the inside diameter of the cylinder, and novel sealing means for said piston head secured to the leading surface thereof, same preventing passage of material therepast while offering a minimum line of contact with the inner circumferential wall of the cylinder.

A further object of the invention is to provide a novel sealing means for an injection means adapted for securement to the forward end of a piston head which is mounted for reciprocable movement within an injection cylinder, said sealing means comprising an integral annular member having a cylindrical body terminating at its forward end in an outwardly flared flange, the cylindrical body having an outer diameter substantially less than the inner diameter of the injection cylinder to be spaced therefrom, the flared flange being tapered from its connection with the member to a narrow circumferential blade edge of diameter making tight engagement with the inner wall of the cylinder on a substantially line contact, the angle between the outer surface of the flared flange and the cylindrical body surface being slightly less than 180°, and the angle between the leading inner surface of the flared flange and a plane normal to the axis of the cylinder being relatively small to provide a stubby taper and hence substantial strength to said flange.

Still further objects of the invention include, provisions of sealing means removably secured to the leading face of the piston head for facilitating removal and replacement thereof whenever necessary; provision of novel cartridges or sleeves capable of being pre-loaded with molding material, said cartridges doubling as removable lining for the injection cylinder; and, provision of a battery of injection cylinders mounted as a turret arrangement and adapted to selectively receive said cartridges and be rotated into alignment with said piston and nozzle to permit continuous step by step injection molding of thermosetting materials.

Referring now to the drawings:

FIG. 3 is an enlarged sectional view of the novel sealing means of the invention as installed upon a piston head.

FIG. 4 is a diagrammatic side elevational view of another apparatus embodying the invention with portions being shown in section.

Figure 1:
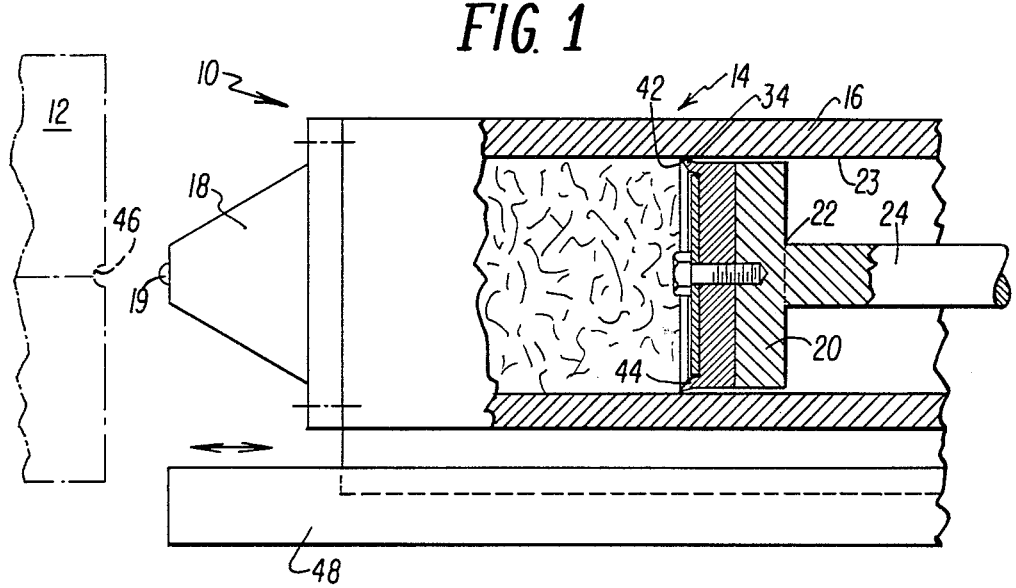
FIG. 1 is a diagrammatic side elevational view of the apparatus embodying the invention with portions thereof shown in section.

Referring to FIG. 1, the apparatus embodying the invention is designated generally by reference character 10 and includes a mold 12 and an injection apparatus, shown generally at 14. The injection apparatus 14 is provided with an injection cylinder 16 having a removable nozzle 18. A piston head 20 of cylindrical configuration is disposed within the cylinder 16 for reciprocating movement therein. Said piston head 20 is mounted coaxially upon one end 22 of a piston rod 24. The other end of the piston rod 24 is connected to a source of actuating pressure, preferably comprising a conventional hydraulically operated device (not shown herein). The diameter of the piston head 20 is chosen to be smaller than the inner diameter of the cylinder 16 whereby the piston head 20 does not contact the inner wall of the cylinder 16.

The sealing means embodying the invention is designated generally by reference character 30 and comprises an integral annular body 32 of cylindrical configuration and formed of metal, plastic, hard rubber or other suitable material. The body 32 is secured coaxially to the forward end 26 of the piston head 20 by means such as screw 28 and washer 29. The washer 29 preferably may be chosen to be of a diameter sufficient to extend closely adjacent the root of the flared flange 34. The sealing means 30 may also be formed as an annular ring. The said ring may also be fastened to the piston head 20 in a manner similar to body 32. The bore thereof may be provided with threading in lieu of the screw and plate fastening means to engage similar threading provided on the circumferential wall of the piston.

The outer diameter of the cylindrical body 32 is chosen to be less than the inner diameter of the cylinder 16 to be spaced therefrom. Said body 32 terminates at its forward end in an outwardly flared flange 34, same being defined by inner surfaces 38 and 39. Surface 39 may be referred to as the leading surface or end face of flange 34. Surfaces 38 and 40 are very near parallel one to the other, with the outer surface 40 being slightly longer than the inner surface 38 and an outer surface 40. The flange 34 is tapered from its connection to the body 32 to a narrow circumferential blade edge 42, the diameter of which being at least equal to the diameter of the inner wall 23 of the cylinder 16 whereby only the blade edge 42 is in engagement with the said wall 23 during operation of the injection means 14. Surface 39 comprises the connecting surface between the upper extremities of surfaces 38 and 40 so that blade edge 42 is subtended by the major portion of the flange 34 which is practically uniform in cross-section. The said engagement may be characterized as essentially a line contact.

In defining the blade edge 42, the angle between the outer surface 40 and the circumferential surface of the cylindrical body 32 is chosen to be slightly less than 180°, and the angle between the inner surface 39 and a plane taken normal to the axis of the cylindrical body 32 being relatively small to provide a stubby taper leading to the blade edge 42. In this manner the major portion 44 of said flange is defined and subtends the blade edge 42 to provide substantial strength to the said edge 42. It should be carefully noted that the blade edge 42 is the only portion of the sealing means 30 or the piston 20 that is in contact with the wall 23 of the cylinder. In view of the stubby taper leading to the blade edge 42, that is to say, the mass of the portion 44 supporting said edge 42, the same does not collapse under the conditions of great pressure encountered in the operation of the apparatus 14. No thermosetting material is permitted to seep past the same as the piston is reciprocated within the cylinder, and, because of the substantially line contact between the blade edge 42 and the wall 23 of the cylinder, there is little friction therebetween to generate heat. Thus, any thermosetting material adhering to the wall 23 of the cylinder 16 will not be raised to its setting temperature. Preferably, the length of the stubby taper is of the order of an eighth of an inch.

The effective volume of the cylinder is such that it will accommodate sufficient material to enable numerous molds to be filled.

The molds 12 are merely diagrammatically shown in phantom line in the drawing and may be preferably arranged upon a revolving table (not shown) and brought to the filling position with the inlet 46 thereof aligned with the mouth 19 of nozzle 18. The molds generally are equipped with sufficient heating means to bring same to the setting temperature of the thermosetting material.

The injection cylinder 16 may be mounted upon a carriage guide 48 and is longitudinally shiftable relative to the mold 12. Upon removal of the nozzle 18, the cylinder 16 may be loaded from the front end thereof.

Figure 2:
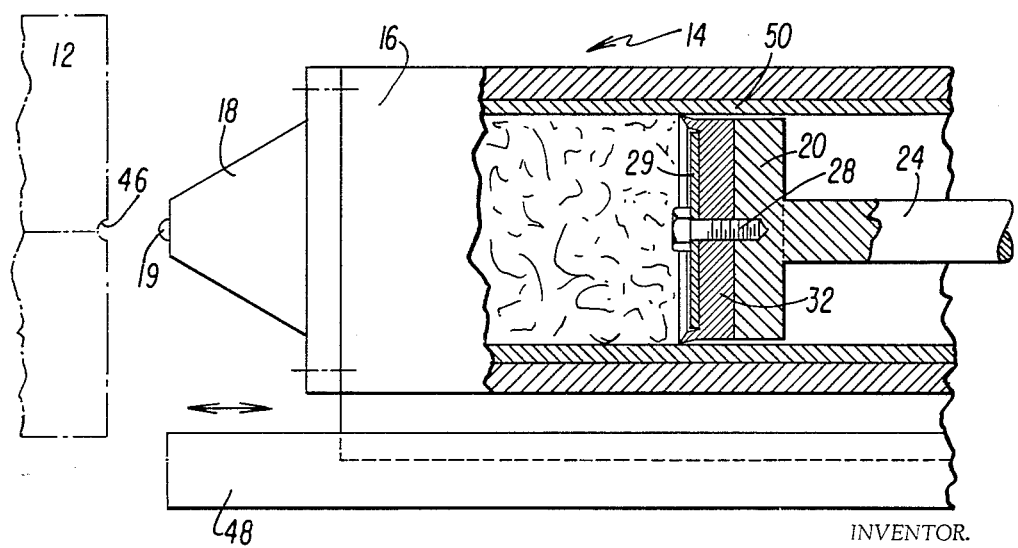
FIG. 2 is a view similar to that of FIG. 1 but illustrating a second embodiment of the invention.

Directing attention now to FIG. 2, the embodiment shown therein utilizes a metal sleeve 50 preferably of flexible steel, same being telescopically inserted into the cylinder 16. When the nozzle 18 is removed from the front end of the cylinder 16, the sleeve 50 may be removed and reloaded. Because of the generally viscous nature of the thermosetting materials, selective preloading of sleeves 50 may be accomplished whereupon the sleeves may be fed horizontally into the cylinder 16 without any loss in material therefrom.

Preferably, the sleeves 50 and the sealing means 30 may be used in combination although either may be used in the absence of the other with a proper adjustment for dimension.

Referring now to FIG. 4, a pair of cylinders 16 are shown arranged mounted one above the other to form a turret arrangement 52. The turret is mounted to pivot about the axis of an upper connecting rod 54. The nozzle 18 is shown to be stationarily mounted upon a platform 49 supported by said upper connecting rod 54 and a second connecting rod 56 disposed below and parallel to said upper rod 54. The axes of rods 54 and 56 are parallel to the axis of the piston rod 24. The turret arrangement 52 is mounted for rotation upon the rod 54 by means of bushings 58. When the piston head 20 is completely retracted from the one of the cylinders 16, the latter can be rotated about the axis of the rod 54 to bring another cylinder 16 into working position.

Since the nozzle is stationary, the turret arrangement 52 must, after every change of cylinder 16 be pressed to a working position against the rear face 17 of the nozzle. This is accomplished by the provision of an annular auxiliary piston 58 mounted concentrically around the piston rod 24 with the front face 60 of the auxiliary piston 58 urged against the end faces of the cylinder 16 and the sleeve 50 while same are in working position. The auxiliary piston 58 is provided with sealing gaskets 62 and 64 and is preferably actuated by hydraulic means (not shown).

In practice, the last described apparatus operates as follows: At the initiation of each working cycle the auxiliary piston 58 is automatically brought to its working position and thereupon, the piston head is urged into the cylinder 16 of turret 52. After retraction of the piston head 20 subsequent to the injection stroke, the auxiliary piston 58 is moved longitudinally away from the nozzle 18 and the turret arrangement 52 rotated to bring a loaded cylinder into alignment with the piston head 20 and nozzle 18. Simultaneously, the revolving table (not shown) has placed a fresh mold in proper position relative the nozzle 18. The nozzle 18 may be removed from its stationary mounting for cleaning and maintenance.

I claim:

1. An injection apparatus for the injection molding of thermosetting materials comprising a hollow cylinder adapted to contain the molding material, a nozzle disposed at one end of the cylinder in communication therewith, a piston disposed for reciprocable movement within said cylinder and adapted to force said material from the cylinder through said nozzle at a substantial ejection pressure, said piston being mounted coaxial with said cylinder and of a diameter smaller than the inner diameter of the cylinder, and sealing means secured to the piston at the forward end thereof, said sealing means comprising an integral annular member having a cylindrical body terminating at its forward end in an outwardly flared flange, the cylindrical body having an outer diameter substantially less than the inner diameter of the cylinder to be spaced therefrom, the flared flange being tapered from its connection with the member to a narrow circumferential blade edge of diameter making tight engagement with the inner wall of the cylinder on a substantially line contact, the angle between the outer surface of the flared flange and the cylindrical body surface being slightly less than 180° and the angle between the leading inner surface of the flared flange and a plane normal to the axis of the cylinder being relatively small to provide a stubby taper and hence substantial strength to said flange.

2. The apparatus as claimed in claim 1 in which the annular cylindrical member is dish shaped in configuration.

3. Apparatus as claimed in claim 1 in which said annular member is removably secured to the piston.

4. Apparatus as claimed in claim 1 in which said cylinder is provided with a removable lining comprising a cylindrical sleeve telescopically engaged within said cylinder between the inner wall thereof and the piston, said piston being spaced from the inner surface of said sleeve as well.

5. Apparatus as claimed in claim 4 in which said sleeve is formed of metal.

6. Apparatus as claimed in claim 1 in which means are provided for mounting more than one of said cylinders turret fashion for rotatable movement parallel to the axis of the piston.

7. Apparatus as claimed in claim 1 in which said cylinder is mounted for slight longitudinal movement toward said nozzle.

8. Apparatus as claimed in claim 1 in which at least a pair of said cylinders are arranged for mounting with axes parallel one to the other to form a turret arrangement, a connecting rod adapted to mount said turret for rotation around the axis thereof, the axis of the connecting rod being parallel to the axes of the piston and cylinders, and means for selectively positioning a succession of said cylinders in operative position aligned with the nozzle and the piston and adapted to receive said piston therein for ejection of molding material from said cylinder.

9. The apparatus as claimed in claim 8 in which said nozzle is mounted stationary relative said cylinders.

10. The apparatus as claimed in claim 9 in which said turret arrangement is displaceable in a longitudinal direction relative said connecting rod and an auxiliary piston is provided successively to urge each cylinder of said turret arrangement into operative position relative said nozzle immediately subsequent to each rotation of the turret arrangement.

11. The apparatus as claimed in claim 1 in which said piston and cylinder comprise a unit which is displaceable relative to said mold.

12. In an injection molding machine for thermosetting materials wherein said machine includes a cylinder defining a container for thermosetting material and a piston assembly, including a piston rod and piston, reciprocably movable within said container whereby to force said material from the front end thereof at substantial pressure; said piston being of a diameter less than the inner diameter of the container whereby said piston is spaced from the said inner wall and sealing means secured to the forward end of said piston, said sealing means enabling the reciprocable movement of the piston without generation of sufficient frictional heat to cause gellification of the material within the container and comprising an integral annular member of generally cylindrical configuration, said member having an outer diameter less than the inner diameter of the container, said member having an annular lip formation extending forwardly thereof, said lip formation having an outwardly flared portion terminating at its outermost extent in a narrow, circumferential blade edge, the diameter of which is at least equal to the diameter of the inner wall of the container, the said edge being subtended by the remaining lip formation to provide supporting strength for said edge during operation of said piston and to prevent distortion of the line contact between the said edge and the inner wall of the container.

13. The apparatus as described in claim 12 wherein a hollow sleeve member of outer diameter substantially equal to the inner diameter of the cylinder and inner diameter the same as the circumferential diameter of said annular member at the blade edge thereof is telescopically engaged within said cylinder to form a removable container for the molding material.

References Cited in the file of this patent

UNITED STATES PATENTS

| | | |
|---|---|---|
| 660,952 | Hall | Oct. 30, 1900 |
| 2,422,990 | Spanier | June 24, 1947 |
| 2,954,586 | Wacker | Oct. 4, 1960 |